3,463,732
Patented Aug. 26, 1969

3,463,732
POLARIZABLE FERROELECTRIC CERAMIC
COMPOSITIONS
Hisao Banno, Aichi Prefecture, and Tsutomu Tsunooka,
Kariya, Japan, assignors to NGK Spark Plug Co., Ltd.,
Nagoya, Japan
No Drawing. Filed July 5, 1967, Ser. No. 651,112
Claims priority, application Japan, Aug. 26, 1966,
41/55,798
Int. Cl. C04b 35/00, 35/46; H01v 7/02
U.S. Cl. 252—62.9    26 Claims

ABSTRACT OF THE DISCLOSURE

A novel and useful polarizable ferroelectric ceramic composition suitable for use in piezoelectric and electrostrictive ceramic articles and consisting essentially of a series of solid solutions expressed by the formula, $$Pb(W_{1/2} \cdot Ma_{1/2})O_3 - PbTiO_3$$

wherein Ma represents at least one element selected from the group consisting of Ni and Zn, or another series of solid solutions expressed by $$Pb(W_{1/2} \cdot Ma_{1/2})O_3 - PbTiO_3 - PbMbO_3$$

wherein Mb represents at least one element selected from the group consisting of Zr and Sn, a series of solid solutions expressed by said formulas $$Pb(W_{1/2} \cdot Ma_{1/2})O_3 - PbTiO_3$$

or $$Pb(W_{1/2} \cdot Ma_{1/2})O_3 - PbTiO_3 - PbMbO_3$$

wherein a part of Pb is replaced by at least one alkaline earth element selected from the group consisting of Ba, Ca and Sr, or said series of solid solutions further containing Mn at a rate corresponding to up to 5.0 weight percent of $MnO_2$ in the aggregate.

---

This invention relates broadly to compositions of matter and articles of manufacture fabricated therefrom.

More particularly, the invention pertains to novel ferroelectric ceramics susceptible of electrostatic polarization and exhibiting, when polarized, electromechanical transducing properties similar to the well-known piezoelectric effect. As a result of these properties, materials, of the type to which the present invention pertains have come to be known and may hereinafter be referred to as "piezoelectric ceramics." While the principal product contemplated by the invention is the matured and polarized ceramic, as well as articles fabricated therefrom, it is to be understood that it also encompasses as intermediates the unreacted physical mixture of raw materials and the heat reaction product of such mixtures. Accordingly, the term "ceramic compositions" will be used herein to encompass and designate generically the compositions of matter at all stages from the unreacted physical mixtures to the matured and polarized ceramic which is the ultimate product.

Polarizable ferroelectric ceramic compositions for use in piezoelectric and electrostrictive elements have a perovskite structure expressed by the formula $ABO_3$ wherein A represents a bivalent metal ion and B represents a four valent metal ion. But, all of the compounds having the perovskite structure do not always exhibit piezoelectric and electrostrictive properties. Some of them such as barium titanate, $BaTiO_3$ singly exhibit piezoelectric and electrostrictive properties, another of them such as lead titanate zirconate, $PbTiO_3$—$PbZrO_3$ do not individually exhibit, as lead titanate and lead zirconate, piezoelectric and electrostrictive properties, but as a solid solution of at least two, for example, two of them exhibit piezoelectric and electrostrictive properties, whilst $ABO_3$ structure wherein B representing four valent ion consists of two ions having different ionic valency such as $$M_{1/2}^{2+} \cdot M_{1/2}^{6+} \text{ or } M_{1/3}^{2+} \cdot M_{2/3}^{5+}$$

wherein $M^{2+}$, $M^{6+}$ and $M^{5+}$ show divalent, six valent and five valent metal ions, respectively, shows as singly or as complex solid solution with another $ABO_3$ structure piezoelectric and electrostrictive properties.

The inventors have found out that $Pb(W_{1/2} \cdot Ma_{1/2})O_3$ having the pervoskite structure wherein W having $M^{6+}$ and Ma having $M^{2+}$ and representing at least one element selected from the group consisting of Ni and Zn are located at the position B of $ABO_3$ does not singly exhibit the piezoelectric and electrostrictive properties in a manner similar to $PbTiO_3$, but solid solutions expressed by the formula $$xPb(W_{1/2} \cdot Ma_{1/2})O_3 - (1-x)PbTiO_3$$

wherein $x = 0.2$ to $0.7$, solid solutions expressed by the formula $$xPb(W_{1/2} \cdot Ma_{1/2})O_3 - yPbTiO_3 - zPbMbO_3$$

wherein Mb represents at least one element selected from the group consisting of Zr and Sn, and $x = 0.02$ to $0.7$, $y = 0.1$ to $0.8$, $z = 0$ to $0.75$ and $x+y+z = 1.0$, and solid solutions expressed by said formulas $$Pb(W_{1/2} \cdot Ma_{1/2})O_3 - PbTiO_3$$

or $Pb(W_{1/2} \cdot Ma_{1/2})O_3 - PbTiO_3 - PbMbO_3$ wherein up to 20 atoms percent of Pb is replaced by at least one alkaline earth element selected from the group consisting of Ba, Ca and Sr exhibit at least 0.10 of electromechanical coupling coefficient kp. and at least 300 of dielectric constant $\epsilon$, and that said series of solid solutions expressed by the formulas $Pb(W_{1/2} \cdot Ma_{1/2})O_3 - PbTiO_3$ or $$Pb(W_{1/2} \cdot Ma_{1/2})O_3 - PbTiO_3 - PbMbO_3$$

wherein from zero to 20 atoms percent of Pb is replaced by at least one alkaline earth element selected from the group consisting of Ba, Ca and Sr and further containing Mn at a rate corresponding to up to 5.0 weight percent of $MnO_2$ in the aggregate conspicuously improve the mechanical quality factor Qm.

The principal object of the invention is to provide a novel and useful polarizable ferroelectric ceramic composition suitable for use in electromechanical transducer elements.

Another object of the invention is to provide a polarizable ferroelectric ceramic composition having a very high mechanical quality factor.

The invention will be explained with reference to the following examples.

EXAMPLE 1

PbO, $WO_3$, NiO, ZnO, $TiO_2$, $ZrO_2$, $SnO_2$, $BaCO_3$, $CaCO_3$ and $SrCO_3$ were admixed and ground such that ceramics having compositions shown in the following Tables 1 and 2 were obtained. Then the product thus obtained was molded and calcined at a temperature of 700 to 1,000° C. and then ground again and sintered in PbO atmosphere at a temperature of 1,100 to 1,400° C. to obtain a disk having a diameter of about 20 mm. and 0.8 mm. in thickness. This disk thus obtained was electroded at each main surface with a silver electrode and polarized for one hour by applying a direct current electric field of 3.2 kv. (40 kv./cm.) at a temperature of 80° C. This disk thus treated was stored in the air at room temperature for one week and then the electromechanical coupling coefficient kp. and dielectric constant $\epsilon$ of the disk were measured. The results thus obtained were shown in the following Tables 1 and 2.

TABLE 1

| Sample No. | Composition (molar ratio) | | | | Electromechanical coupling coefficient, kp. | Dielectric constant, ε |
|---|---|---|---|---|---|---|
| | $Pb(W_{1/2}\cdot Ni_{1/2})O_3$ | $PbTiO_3$ | $PbZrO_3$ | $PbSnO_3$ | | |
| 1 | 0.2 | 0.8 | | | 0.11 | 350 |
| 2 | 0.3 | 0.7 | | | 0.18 | 460 |
| 3 | 0.4 | 0.6 | | | 0.20 | 650 |
| 4 | 0.5 | 0.5 | | | 0.16 | 700 |
| 5 | 0.6 | 0.4 | | | 0.12 | 1,800 |
| 6 | 0.7 | 0.3 | | | 0.10 | 2,500 |
| 7 | 0.05 | 0.75 | 0.2 | | 0.15 | 480 |
| 8 | 0.05 | 0.65 | 0.3 | | 0.30 | 700 |
| 9 | 0.05 | 0.55 | 0.4 | | 0.45 | 950 |
| 10 | 0.05 | 0.45 | 0.5 | | 0.50 | 1,700 |
| 11 | 0.05 | 0.35 | 0.6 | | 0.41 | 470 |
| 12 | 0.1 | 0.75 | 0.15 | | 0.20 | 510 |
| 13 | 0.1 | 0.65 | 0.25 | | 0.30 | 710 |
| 14 | 0.1 | 0.52 | 0.38 | | 0.50 | 1,200 |
| 15 | 0.1 | 0.45 | 0.45 | | 0.60 | 1,800 |
| 16 | 0.1 | 0.25 | 0.65 | | 0.30 | 380 |
| 17 | 0.1 | 0.15 | 0.75 | | 0.25 | 320 |
| 18 | 0.2 | 0.7 | 0.1 | | 0.18 | 460 |
| 19 | 0.2 | 0.6 | 0.2 | | 0.23 | 560 |
| 20 | 0.2 | 0.5 | 0.3 | | 0.35 | 880 |
| 21 | 0.2 | 0.4 | 0.4 | | 0.54 | 1,090 |
| 22 | 0.2 | 0.3 | 0.5 | | 0.33 | 560 |
| 23 | 0.2 | 0.2 | 0.6 | | 0.25 | 460 |
| 24 | 0.3 | 0.6 | 0.1 | | 0.21 | 490 |
| 25 | 0.3 | 0.5 | 0.2 | | 0.23 | 770 |
| 26 | 0.3 | 0.4 | 0.3 | | 0.39 | 1,440 |
| 27 | 0.3 | 0.3 | 0.4 | | 0.33 | 810 |
| 28 | 0.3 | 0.2 | 0.5 | | 0.23 | 780 |
| 29 | 0.4 | 0.5 | 0.1 | | 0.23 | 800 |
| 30 | 0.4 | 0.4 | 0.2 | | 0.25 | 1,300 |
| 31 | 0.4 | 0.3 | 0.3 | | 0.35 | 2,700 |
| 32 | 0.4 | 0.2 | 0.1 | | 0.30 | 800 |
| 33 | 0.5 | 0.4 | 0.1 | | 0.22 | 1,230 |
| 34 | 0.5 | 0.3 | 0.2 | | 0.20 | 1,900 |
| 35 | 0.5 | 0.2 | 0.3 | | 0.15 | 2,500 |
| 36 | 0.6 | 0.3 | 0.1 | | 0.15 | 1,500 |
| 37 | 0.6 | 0.2 | 0.2 | | 0.15 | 2,400 |
| 38 | 0.7 | 0.2 | 0.1 | | 0.10 | 2,700 |
| 39 | 0.3 | 0.6 | | 0.1 | 0.20 | 480 |
| 40 | 0.3 | 0.5 | | 0.2 | 0.25 | 810 |
| 41 | 0.3 | 0.4 | | 0.3 | 0.35 | 1,330 |
| 42 | 0.3 | 0.3 | | 0.4 | 0.32 | 750 |
| 43 | 0.3 | 0.2 | | 0.5 | 0.26 | 700 |
| 44 | [1] 0.1 | 0.45 | 0.45 | | 0.52 | 1,500 |
| 45 | [1] 0.3 | 0.35 | 0.35 | | 0.59 | 2,500 |

[1] $Pb(W_{1/2}\cdot Zn_{1/2})O_3$ was used in place of $Pb(W_{1/2}\cdot Ni_{1/2})O_3$.

TABLE 2

| Sample No. | Composition | Electromechanical coupling coefficient, kp. | Dielectric constant, ε |
|---|---|---|---|
| 46 | $(Pb_{0.95}\text{-}Sr_{0.05})(W_{0.05}\text{-}Ni_{0.05}\text{-}Ti_{0.46}\text{-}Zr_{0.44})O_3$ | 0.55 | 1,580 |
| 47 | $(Pb_{0.98}\text{-}Ca_{0.02})(W_{0.05}\text{-}Ni_{0.05}\text{-}Ti_{0.46}\text{-}Zr_{0.44})O_3$ | 0.49 | 1,240 |
| 48 | $(Pb_{0.85}\text{-}Ba_{0.15})(W_{0.05}\text{-}Ni_{0.05}\text{-}Ti_{0.46}\text{-}Zr_{0.44})O_3$ | 0.53 | 1,580 |

As can be seen from the Tables 1 and 2, the compositions expressed by the formula, $xPb(W_{1/2}\cdot Ma_{1/2})O_3$—$(1-x)PbTiO_3$ wherein Ma represents at least one element selected from the group consisting of Ni and Zn, and $x=0.2$ to 0.7, the compositions expressed by the formula, $xPb(W_{1/2}\cdot Ma_{1/2})O_3$—$yPbTiO_3$—$zPbMbO_3$ wherein Mb represents at least one element selected from the group consisting of Zr and Sn, and $x=0.02$ to 0.7, $y=0.1$ to 0.8, $z=0$ to 0.75 and $x+y+z=1.0$ and the compositions expressed by said formulas, $$xPb(W_{1/2}\cdot Ma_{1/2})O_3—(1-x)PbTiO_3$$

or $xPb(W_{1/2}\cdot Ma_{1/2})O_3$—$yPbTiO_3$—$zPbMbO_3$ wherein up to 20 atom percent of Pb is replaced by at least one alkaline earth element selected from the group consisting of Ba, Ca and Sr showed at least 0.1 of electromechanical coupling coefficient kp. and at least 300 of dielectric constant ε and were suitable for use in practice as piezoelectric and electrostrictive ceramics. The range of $x=0.09$ to 0.45, $y=0.25$ to 0.65, $z=0.25$ to 0.6 and $x+y+z=1.0$ exhibiting more than 0.3 of electromechanical coupling coefficient kp. and more than 400 of dielectric constant ε is preferable.

EXAMPLE 2

PbO, $WO_3$, NiO, $TiO_2$ and $ZrO_2$ were admixed such that the basic composition expressed by the formula, $0.3Pb(W_{1/2}\cdot Ni_{1/2})O_3$—$0.5PbTiO_3$—$0.2PbZrO_3$ was obtained. The composition thus obtained was further added with $MnO_2$ and ground. The product thus obtained was molded and calcined at a temperature of 700 to 900° C. and then ground again and molded and subsequently sintered in PbO atmosphere at a temperature of 1,000 to 1,300° C. to obtain a disk having a diameter of about 20 mm. and 0.8 mm. in thickness. This disk was electroded at each main surface with a silver electrode and then polarized by applying direct current electric field of 3.2 kv. (40 kv./cm.) at a temperature of 80° C. for one hour. This disk was then stored in the air at room temperature for one week and electromechanical coupling coefficient kp., dielectric constant ε and mechanical quality factor Qm of the disk were measured. The results thereof were shown in the following Table 3.

TABLE 3

| Sample No.: | Content of $MnO_2$ (wt. percent) | Electromechanical coupling coefficient, kp. | Dielectric constant, $\epsilon$ | Mechanical quality factor, Qm |
|---|---|---|---|---|
| 25 [1] | 0 | 0.23 | 770 | 70 |
| 51 | 0.05 | 0.31 | 1,460 | 181 |
| 52 | 0.1 | 0.39 | 2,045 | 284 |
| 53 | 0.3 | 0.27 | 1,044 | 1,015 |
| 54 | 0.5 | 0.22 | 1,100 | 2,000 |
| 55 | 1.0 | 0.22 | 1,240 | 1,195 |
| 56 | 2.0 | 0.19 | 1,547 | 1,115 |
| 57 | 3.0 | 0.15 | 1,638 | 847 |
| 58 | 4.0 | 0.12 | 1,745 | 531 |
| 59 | 5.0 | 0.10 | 1,890 | 233 |

[1] The sample No. 25 was the same as that shown in the Table 1 and shown for the sake of comparison with the other samples.

As can be seen from the Table 3 addition of up to 5.0 weight percent of $MnO_2$ makes it possible to maintain more than 0.10 of the electromechanical coupling coefficient kp. which is suitable in practice for use in piezoelectric and electrostrictive ceramics and remarkably improve the mechanical quality factor Qm. That is, addition of at least 0.05 weight percent of $MnO_2$ renders it possible to elevate Qm twice as large as that without addition of $MnO_2$. Addition of 0.5 weight percent of $MnO_2$ showed the maximum value of Qm.

EXAMPLE 3

PbO, $WO_3$, NiO, ZnO, $TiO_2$, $ZrO_2$, $SnO_2$, $BaCO_3$, $CaCO_3$, $SrCO_3$ and $MnO_2$ were admixed such that ceramics having the compositions shown in the following Tables 4 and 5 were obtained. The samples were manufactured in a manner similar to that explained in the Example 2. The samples thus manufactured were polarized and electromechanical coupling coefficient kp., dielectric constant $\epsilon$ and mechanical quality factor Qm of the samples were measured, the results of which being shown in the following Tables 4 and 5.

TABLE 4

| | Basic composition (molar ratio) | | | | Content of $MnO_2$ (wt. percent) | Electromechanical coupling coefficient, kp. | Dielectric constant, $\epsilon$ | Mechanical quality factor, Qm |
|---|---|---|---|---|---|---|---|---|
| | $Pb(W_{1/2}\cdot Ni_{1/2})O_3$ | $PbTiO_3$ | $PbZrO_3$ | $PbSnO_3$ | | | | |
| Sample No.: | | | | | | | | |
| 61A | 0.3 | 0.7 | | | 0 | 0.18 | 460 | 145 |
| 61B | 0.3 | 0.7 | | | 0.5 | 0.15 | 423 | 1,015 |
| 62A | 0.03 | 0.27 | 0.7 | | 0 | 0.14 | 310 | 140 |
| 62B | 0.03 | 0.27 | 0.7 | | 0.5 | 0.13 | 170 | 230 |
| 63A | 0.1 | 0.4 | 0.5 | | 0 | 0.52 | 1,228 | 127 |
| 63B | 0.1 | 0.4 | 0.5 | | 0.5 | 0.39 | 597 | 435 |
| 64A | 0.1 | 0.52 | 0.38 | | 0 | 0.50 | 1,200 | 120 |
| 64B | 0.1 | 0.52 | 0.38 | | 0.5 | 0.40 | 1,000 | 500 |
| 65A | 0.1 | 0.6 | 0.3 | | 0 | 0.37 | 828 | 161 |
| 65B | 0.1 | 0.6 | 0.3 | | 0.5 | 0.29 | 597 | 435 |
| 66A | 0.2 | 0.15 | 0.65 | | 0 | 0.13 | 310 | 180 |
| 66B | 0.2 | 0.15 | 0.65 | | 0.5 | 0.13 | 180 | 260 |
| 67A | 0.2 | 0.4 | 0.4 | | 0 | 0.54 | 1,090 | 75 |
| 67B | 0.2 | 0.4 | 0.4 | | 0.5 | 0.33 | 528 | 598 |
| 68A | 0.2 | 0.5 | 0.3 | | 0 | 0.35 | 880 | 187 |
| 68B | 0.2 | 0.5 | 0.3 | | 0.5 | 0.37 | 961 | 850 |
| 69A | 0.3 | 0.6 | 0.1 | | 0 | 0.21 | 490 | 95 |
| 69B | 0.3 | 0.6 | 0.1 | | 0.5 | 0.13 | 510 | 933 |
| 25 [1] | 0.3 | 0.5 | 0.2 | | 0 | 0.23 | 770 | 70 |
| 54 [1] | 0.3 | 0.5 | 0.2 | | 0.5 | 0.22 | 1,100 | 2,000 |
| 70A | 0.3 | 0.4 | 0.3 | | 0 | 0.39 | 1,440 | 15 |
| 70B | 0.3 | 0.4 | 0.3 | | 0.5 | 0.40 | 2,100 | 1,000 |
| 71A | 0.3 | 0.3 | 0.4 | | 0 | 0.33 | 810 | 60 |
| 71B | 0.3 | 0.3 | 0.4 | | 0.5 | 0.30 | 1,500 | 850 |
| 72A | 0.3 | 0.2 | 0.5 | | 0 | 0.23 | 780 | 65 |
| 72B | 0.3 | 0.2 | 0.5 | | 0.5 | 0.25 | 670 | 1,700 |
| 73A | 0.4 | 0.4 | 0.2 | | 0 | 0.25 | 1,300 | 89 |
| 73B | 0.4 | 0.4 | 0.2 | | 0.5 | 0.21 | 1,412 | 1,123 |
| 74A | 0.4 | 0.3 | 0.3 | | 0 | 0.35 | 2,700 | 78 |
| 74B | 0.4 | 0.3 | 0.3 | | 0.5 | 0.20 | 528 | 610 |
| 75A | 0.5 | 0.4 | 0.1 | | 0 | 0.22 | 1,230 | 121 |
| 75B | 0.5 | 0.4 | 0.1 | | 0.5 | 0.10 | 2,115 | 1,421 |
| 76A | 0.5 | 0.2 | 0.3 | | 0 | 0.15 | 2,500 | 147 |
| 76B | 0.5 | 0.2 | 0.3 | | 0.5 | 0.13 | 431 | 345 |
| 77A | 0.65 | 0.25 | 0.1 | | 0 | 0.10 | 1,700 | 170 |
| 77B | 0.65 | 0.25 | 0.1 | | 0.5 | 0.10 | 1,300 | 220 |
| 78A | 0.3 | 0.5 | | 0.2 | 0 | 0.25 | 810 | 134 |
| 78B | 0.3 | 0.5 | | 0.2 | 0.5 | 0.15 | 520 | 546 |
| 79A | 0.3 | 0.2 | | 0.5 | 0 | 0.26 | 760 | 143 |
| 79B | 0.3 | 0.2 | | 0.5 | 0.5 | 0.21 | 532 | 728 |
| 80A | [2] 0.1 | 0.45 | 0.45 | | 0 | 0.52 | 1,550 | 75 |
| 80B | [2] 0.1 | 0.45 | 0.45 | | 0.5 | 0.45 | 1,200 | 340 |
| 81A | [2] 0.2 | 0.40 | 0.40 | | 0 | 0.55 | 1,800 | 72 |
| 81B | [2] 0.2 | 0.40 | 0.40 | | 0.5 | 0.50 | 1,310 | 480 |
| 82A | [2] 0.3 | 0.35 | 0.35 | | 0 | 0.59 | 2,500 | 80 |
| 82B | [2] 0.3 | 0.35 | 0.35 | | 0.5 | 0.51 | 1,420 | 350 |

[1] Samples Nos. 25 and 54 were the same as those shown in the Example 2, Table 3 and shown for the sake of comparison with the other samples.
[2] $Pb(W_{1/2}\cdot Zn_{1/2})O_3$ was used in place of $Pb(W_{1/2}\cdot Ni_{1/2})O_3$.

TABLE 5

| Sample No.: | Basic composition | Content of $MnO_2$ (wt. percent) | Electromechanical coupling coefficient, kp. | Dielectric constant, $\epsilon$ | Mechanical quality factor, Qm |
|---|---|---|---|---|---|
| 46 [1] | $(Pb_{0.95}\cdot Sr_{0.05})(W_{0.5}\cdot Ni_{0.5}\cdot Ti_{0.45}\cdot Zr_{0.44})O_3$ | 0 | 0.55 | 1,550 | 75 |
| 46B | $(Pb_{0.95}\cdot Sr_{0.05})(W_{0.5}\cdot Ni_{0.5}\cdot Ti_{0.46}\cdot Zr_{0.44})O_3$ | 1 | 0.50 | 1,210 | 428 |
| 47 [1] | $(Pb_{0.98}\cdot Ca_{0.02})(W_{0.5}\cdot Ni_{0.5}\cdot Ti_{0.45}\cdot Zr_{0.44})O_3$ | 0 | 0.49 | 1,240 | 79 |
| 47B | $(Pb_{0.98}\cdot Ca_{0.02})(W_{0.5}\cdot Ni_{0.5}\cdot Ti_{0.46}\cdot Zr_{0.44})O_3$ | 1 | 0.55 | 1,180 | 334 |
| 48 [1] | $(Pb_{0.85}\cdot Ba_{0.15})(W_{0.5}\cdot Ni_{0.5}\cdot Ti_{0.46}\cdot Zr_{0.44})O_3$ | 0 | 0.53 | 1,550 | 92 |
| 48B | $(Pb_{0.85}\cdot Ba_{0.15})(W_{0.5}\cdot Ni_{0.5}\cdot Ti_{0.46}\cdot Zr_{0.44})O_3$ | 1 | 0.56 | 1,430 | 439 |

[1] Samples Nos. 46, 47 and 48 were the same as those shown in the Example 1, Table 2 and shown for the sake of comparison with the other samples.

As can be seen from the above Tables 4 and 5, $$xPb(W_{1/2} \cdot Ni_{1/2})O_3 - yPbTiO_3 - zPbMbO_3$$

wherein Ma represents at least one element selected from the group consisting of Ni and Zn, and Mb represents at least one element selected from the group consisting of Zr and Sn, $x=0.02$ to 0.7, $y=0.1$ to 0.8, $z=0$ to 0.75 and $x+y+z=1.0$, and from zero to 20 atom percent of Pb is replaced by at least one alkaline earth element selected from the group consisting of Ba, Ca and Sr, and further containing 0.5 or 1.0 weight percent of $MnO_2$ is capable of holding more than 0.10 of electromechanical coupling coefficient kp, which can practicably be used as piezoelectric and electrostrictive ceramics and of remarkably improving mechanical quality factor Qm. Particularly, the range of $x=0.05$ to 0.6, $y=0.1$ to 0.8, $z=0$ to 0.6 and $x+y+z=1.0$ is preferable, because such range makes it possible to improve the mechanical quality factor Qm twice as large as that without adding $MnO_2$.

Manganese may be added in the form of metals, oxides or other compounds. Manganese may be added at a ratio corresponding to from 0 to 5.0 weight percent of $MnO_2$ in the aggregate. In this case it is preferable to increase the amount of lead such that lead becomes in balance with manganese added.

$Pb(W_{1/2} \cdot Ma_{1/2})O_3$, $PbTiO_3$ and $PbMbO_3$ each constituting the basic composition according to the invention have perovskite structure expressed by the formula, $ABO_3$, respectively, and do not individually exhibit piezoelectric and electrostrictive properties, but exhibit, when formed into complex solid solutions expressed by the formulas, $$xPb(W_{1/2} \cdot Ma_{1/2})O_3 - (1-x)PbTiO_3$$

wherein $x=0.2$ to 0.7 or $$xPb(W_{1/2} \cdot Ma_{1/2})O_3 - yPbTiO_3 - zPbMbO_3$$

wherein $x=0.02$ to 0.7, $y=0.1$ to 0.8, $z=0$ to 0.75 and $x+y+z=1.0$, piezoelectric and electrostrictive properties.

When a part of Pb in the above composition of $xPb(W_{1/2} \cdot Ma_{1/2})O_3 - (1-x)PbTiO_3$ or $xPb(W_{1/2} \cdot Ma_{1/2})O_3 - yPbTiO_3 - zPbMbO_3$ is substituted with at least one alkaline earth element selected from the group consisting of Ba, Ca and Sr, the rate of the substitution is to be less than 20 atom percent, because a substitution in excess of 20 atom percent causes remarkable deterioration of piezoelectric properties of products.

The ceramic composition according to the invention, when expressed by the above mentioned formulas, exhibits the highest piezoelectric and electrostrictive properties. But it is difficult in practice to obtain the atomic ratio as strictly defined by the above mentioned formulas even if sintering treatment is effected in specially adjusted atmosphere or the amount of the ingredients to be added is increased beforehand in order to compensate for vaporization of the ingredients during sintering of the ceramic composition. Some deviation from the above mentioned atomic ratio is allowable since the ceramic composition according to the invention is not substantially influenced by such deviation.

What we claim is:

1. A polarizable ferroelectric ceramic composition consisting essentially of a compound expressed by the formula, $xPb(W_{1/2} \cdot Ma_{1/2})O_3 - yPbTiO_3 - zPbMbO_3$ wherein Ma represents at least one element selected from the group consisting of Ni and Zn, Mb represents at least one element selected from the group consisting of Zr and Sn, and $x=0.02$ to 0.7, $y=0.1$ to 0.8, $z=0$ to 0.75 and $x+y+z=1.0$, said composition including, as a substituent for an equivalent amount of lead therein, from zero to 20 atom percent, in the aggregate, of at least one alkaline earth element selected from the group consisting of Ba, Ca and Sr, and further containing manganese in an amount corresponding to from zero to 5.0 weight percent of $MnO_2$ in the aggregate.

2. A polarizable ferroelectric ceramic composition consisting essentially of a compound expressed by the formula, $xPb(W_{1/2} \cdot Ma_{1/2})O_3 - yPbTiO_3 - zPbMbO_3$ wherein Ma represents at least one element selected from the group consisting of Ni and Zn, Mb represents at least one element selected from the group consisting of Zr and Sn, and $x=0.02$ to 0.7, $y=0.1$ to 0.8, $z=0$ to 0.75 and $x+y+z=1.0$.

3. A polarizable ferroelectric ceramic composition as claimed in claim 2 wherein up to 20 atom percent of Pb is replaced by at least one alkaline earth element selected from the group consisting of Ba, Ca and Sr.

4. A polarizable ferroelectric ceramic composition consisting essentially of a compound expressed by the formula, $xPb(W_{1/2} \cdot Ni_{1/2})O_3 - yPbTiO_3 - zPbMbO_3$ wherein Mb represents at least one element selected from the group consisting of Zr and Sn, and $x=0.02$ to 0.7, $y=0.1$ to 0.8, $z=0$ to 0.75 and $x+y+z=1.0$.

5. A polarizable ferroelectric ceramic composition as claimed in claim 4 wherein up to 20 atom percent of Pb is replaced by at least one alkaline earth element selected from the group consisting of Ba, Ca and Sr.

6. A polarizable ferroelectric ceramic composition consisting essentially of a compound expressed by the formula, $xPb(W_{1/2} \cdot Zn_{1/2})O_3 - yPbTiO_3 - zPbMbO_3$ wherein Mb represents at least one element selected from the group consisting of Zr and Sn, and $x=0.02$ to 0.7, $y=0.1$ to 0.8, $z=0$ to 0.75 and $x+y+z=1.0$.

7. A polarizable ferroelectric ceramic composition as claimed in claim 6 wherein up to 20 atom percent of Pb is replaced by at least one alkaline earth element selected from the group consisting of Ba, Ca and Sr.

8. A polarizable ferroelectric ceramic composition consisting essentially of a compound expressed by the formula, $xPb(W_{1/2} \cdot Ni_{1/2})O_3 - (1-x)PbTiO_3$ wherein $x=0.2$ to 0.7.

9. A polarizable ferroelectric ceramic composition as claimed in claim 8 wherein up to 20 atom percent of Pb is replaced by at least one alkaline earth element selected from the group consisting of Ba, Ca and Sr.

10. A polarizable ferroelectric ceramic composition consisting essentially of a compound expressed by the formula, $xPb(W_{1/2} \cdot Zn_{1/2})O_3 - yPbTiO_3 - zPbMbO_3$ wherein Mb represents at least one element selected from the group consisting of Zr and Sn, and $x=0.09$ to 0.45, $y=0.25$ to 0.65, $z=0.25$ to 0.6 and $x+y+z=1.0$.

11. A polarizable ferroelectric ceramic composition as claimed in claim 10 wherein up to 20 atom percent of Pb is replaced by at least one alkaline earth element selected from the group consisting of Ba, Ca and Sr.

12. A polarizable ferroelectric ceramic composition consisting essentially of a compound expressed by the formula, $xPb(W_{1/2} \cdot Ni_{1/2})O_3 - yPbTiO_3 - zPbMbO_3$ wherein Mb represents at least one element selected from the group consisting of Zr and Sn, and $x=0.09$ to 0.45, $y=0.25$ to 0.65, $z=0.25$ to 0.6 and $x+y+z=1.0$.

13. A polarizable ferroelectric ceramic composition as claimed in claim 12 wherein up to 20 atom percent of Pb is replaced by at least one alkaline earth element selected from the group consisting of Ba, Ca and Sr.

14. A polarizable ferroelectric ceramic composition consisting essentially of a compound expressed by the formula, $xPb(W_{1/2} \cdot Ni_{1/2})O_3 - yPbTiO_3 - zPbZrO_3$ wherein $x=$about 0.2, $y=$about 0.4, $z=$about 0.4 and $x+y+z=1.0$.

15. A polarizable ferroelectric ceramic composition consisting essentially of a compound expressed by the formula, $$xPb(W_{1/2} \cdot Ni_{1/2})O_3 - yPbTiO_3 - zPbZrO_3$$

wherein $x=$about 0.1, $y=$about 0.52, $z=$about 0.38 and $x+y+z=1.0$.

16. A polarizable ferroelectric ceramic composition consisting essentially of a compound expressed by the formula, $$x\text{Pb}(W_{1/2} \cdot Ma_{1/2})O_3 - y\text{PbTiO}_3 - z\text{PbMbO}_3$$

wherein Ma represents at least one element selected from the group consisting of Ni and Zn, Mb represents at least one element selected from the group consisting of Zr and Sn, and $x=0.02$ to $0.7$, $y=0.1$ to $0.8$, $z=0$ to $0.75$ and $x+y+z=1.0$, and further containing manganese in an amount corresponding to up to 5.0 weight percent of $MnO_2$ in the aggregate.

17. A polarizable ferroelectric ceramic composition as claimed in claim 16 wherein up to 20 atom percent of Pb is replaced by at least one alkaline earth element selected from the group consisting of Ba, Ca and Sr.

18. A polarizable ferroelectric ceramic composition consisting essentially of a compound expressed by the formula, $$x\text{Pb}(W_{1/2} \cdot Ni_{1/2})O_3 - y\text{PbTiO}_3 - z\text{PbMbO}_3$$

wherein Mb represents at least one element selected from the group consisting of Zr and Sn, and $x=0.05$ to $0.6$, $y=0.1$ to $0.8$, $z=0$ to $0.6$ and $x+y+z=1.0$, and further containing manganese in an amount corresponding to from 0.05 to 5.0 weight percent of $MnO_2$ in the aggregate.

19. A polarizable ferroelectric ceramic composition as claimed in claim 18 wherein up to 20 atom percent of Pb is replaced by at least one alkaline earth element selected from the group consisting of Ba, Ca and Sr.

20. A polarizable ferroelectric ceramic composition consisting essentially of a compound expressed by the formula, $$x\text{Pb}(W_{1/2} \cdot Zn_{1/2})O_3 - y\text{PbTiO}_3 - z\text{PbMbO}_3$$

wherein Mb represents at least one element selected from the group consisting of Zr and Sn, and $x=0.05$ to $0.6$, $y=0.1$ to $0.8$, $z=0$ to $0.6$ and $x+y+z=1.0$, and further containing manganese in an amount corresponding to from 0.05 to 5.0 weight percent of $MnO_2$ in the aggregate.

21. A polarizable ferroelectric ceramic composition as claimed in claim 20 wherein up to 20 atom percent of Pb is replaced by at least one alkaline earth element selected from the group consisting of Ba, Ca and Sr.

22. A polarizable ferroelectric ceramic composition consisting essentially of a compound expressed by the formula, $$x\text{Pb}(W_{1/2} \cdot Ni_{1/2})O_3 - y\text{PbTiO}_3 - z\text{PbMbO}_3$$

wherein Mb represents at least one element selected from the group consisting of Zr and Sn, and $x=0.05$ to $0.6$, $y=0.1$ to $0.8$, $z=0$ to $0.6$ and $x+y+z=1.0$, and further containing manganese in an amount corresponding to about 0.5 weight percent of $MnO_2$ in the aggregate.

23. A polarizable ferroelectric ceramic composition as claimed in claim 22 wherein up to 20 atom percent of Pb is replaced by at least one alkaline earth element selected from the group consisting of Ba, Ca and Sr.

24. A polarizable ferroelectric ceramic composition consisting essentially of a compound expressed by the formula, $$x\text{Pb}(W_{1/2} \cdot Zn_{1/2})O_3 - y\text{PbTiO}_3 - z\text{PbMbO}_3$$

wherein Mb represents at least one element selected from the group consisting of Zr and Sn, and $x=0.05$ to $0.6$, $y=0.1$ to $0.8$, $z=0$ to $0.6$ and $x+y+z=1.0$, and further containing manganese in an amount corresponding to about 0.5 weight percent of $MnO_2$ in the aggregate.

25. A polarizable ferroelectric ceramic composition consisting essentially of a compound expressed by the formula, $$x\text{Pb}(W_{1/2} \cdot Ni_{1/2})O_3 - y\text{PbTiO}_3 - z\text{PbZrO}_3$$

wherein $x=$about 0.1, $y=$about 0.52, $z=$about 0.38 and $x+y+z=1.0$, and further containing manganese in an amount corresponding to up to 5.0 weight percent of $MnO_2$ in the aggregate.

26. A polarizable ferroelectric ceramic composition consisting essentially of a compound expressed by the formula, $$x\text{Pb}(W_{1/2} \cdot Ni_{1/2})O_3 - y\text{PbTiO}_3 - z\text{PbZrO}_3$$

wherein $x=$about 0.2, $y=$about 0.4, $z=$about 0.4 and $x+y+z=1.0$, and further containing manganese in an amount corresponding to up to 5.0 weight percent of $MnO_2$ in the aggregate.

References Cited

UNITED STATES PATENTS 3,372,121   3/1968   Banno _____ 252—62.9

TOBIAS E. LEVOW, Primary Examiner

J. COOPER, Assistant Examiner

U.S. Cl. X.R.

106—39

UNITED STATES PATENT OFFICE
CERTIFICATE OF CORRECTION

Patent No. 3,463,732                                                             August 26, 1969

Hisao Banno et al.

It is certified that error appears in the above identified patent and that said Letters Patent are hereby corrected as shown below:

In the heading to the printed specification, line 9, "41/55,798" should read -- 41/74,054 --. Column 2, line 4, $M^{2+}_{5/3}$ should read $M^{5+}_{2/3}$ Columns 3 and 4, TABLE 1, fourth column, line 32 thereof "0.1" should read -- 0.4 --. Columns 5 and 6, TABLE 4, eithth column,] 16 thereof, "850" should read -- 857 --.

Signed and sealed this 10th day of November 1970.

(SEAL)
Attest:

Edward M. Fletcher, Jr.                                    WILLIAM E. SCHUYLER, JR.
Attesting Officer                                                   Commissioner of Patents